T. PENDELL.
PNEUMATIC WHEEL FOR VEHICLES.
APPLICATION FILED NOV. 28, 1911.
1,071,571. Patented Aug. 26, 1913.
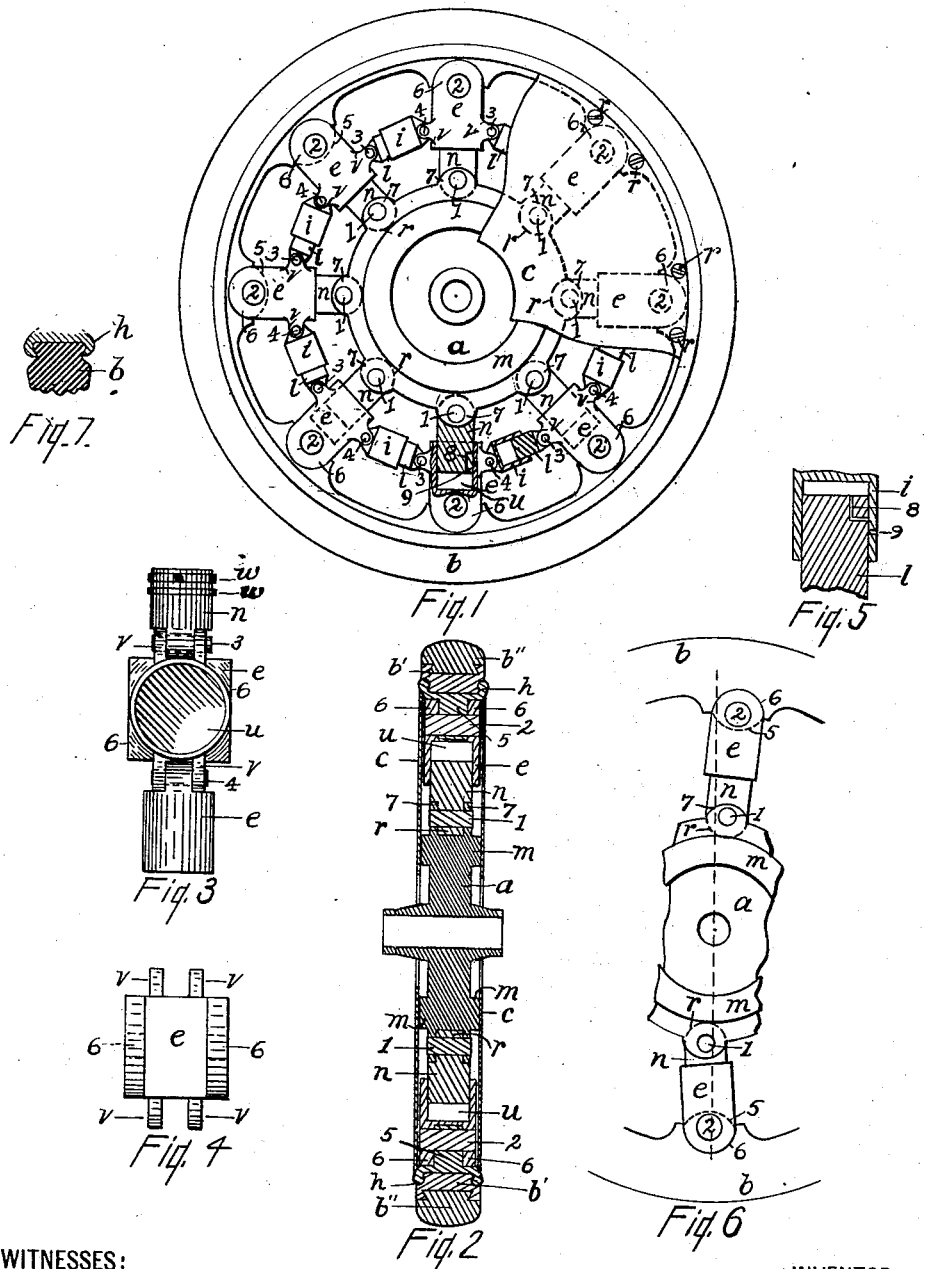
WITNESSES:
K. E. Anderson
Allen Barger
INVENTOR
Thomas Pendell
BY
H. Anderson
ATTORNEY

UNITED STATES PATENT OFFICE.

THOMAS PENDELL, OF POUGHKEEPSIE, NEW YORK.

PNEUMATIC WHEEL FOR VEHICLES.

1,071,571.  Specification of Letters Patent.  Patented Aug. 26, 1913.

Application filed November 28, 1911. Serial No. 662,915.

*To all whom it may concern:*

Be it known that I, THOMAS PENDELL, a citizen of the United States, and resident of Poughkeepsie, in the county of Dutchess and State of New York, have invented certain new and useful Improvements in Pneumatic Wheels for Vehicles, of which the following is a specification.

This invention relates to pneumatic wheels for vehicles or other uses, and has for its object the purpose of a substitution for the pneumatic tire without the loss of the resiliency of the pneumatic tire, and a further object, that when used in connection with the pneumatic tire of extending the life of the said tire.

The objects are attained by the means set forth in this specification and the accompanying drawings.

Reference being made to the drawings: Figure 1 is a side elevation of the pneumatic wheel showing part of cover plate broken away, and tires in cross-section. Fig. 2 is a vertical transverse section through the center of the wheel. Fig. 3 is an enlarged view of air compressor cylinders. Fig. 4 is a plan of one end of the central cylinder shown in Fig. 3. Fig. 5 shows the adaptation of a valve to the chamber in the cylinder. Fig. 6 is a side elevation of a section of the pneumatic wheel under load. Fig. 7 is a cross-section through one form of tire and the rim.

The metallic rim $b'$ of this wheel may be made upon its periphery to adapt it to a pneumatic tire as shown in transverse section at $d$, or for a commercial tire as shown at $g$. The inner face of the rim is provided with lugs 5, as in Figs. 1, 2 and 6.

The hub $a$ of the wheel may be of such diameter as required, and its periphery is provided with double hinge lugs 7, as shown in Figs. 1, 2 and 6 these lugs corresponding in number and position with the lugs 5 on the rim. An air compression cylinder $e$ is hinged upon the lugs 5 upon the rim and swings upon the pintle 2. The hinge end of the cylinder is formed as in Figs. 3 and 4, in which the cylinders are shown upon an enlarged scale. The lugs 6 are made upon a square base, and their contour is a semicircle, fitting into the rim as shown in Figs. 1 2 and 6, and concentric with the pintle, so that the thrust upon the cylinder is shared by the hinge surfaces and the pintle. To the lugs 7 upon the hub, plungers $n$ are hinged, the plunger having a hinge lug $r$, semi-circular in contour, and fitting a corresponding socket between the hinge lugs of the hub, as in Figs. 1 and 6, and particularly in Fig. 2. A pintle $l$ secures the hinge parts, and as in the cylinders, the thrust is divided between the hinge bearing surfaces and the pintles. The plunger enters the cylinder described, as shown particularly in longitudinal section in Figs. 1 and 2. When a wheel rim and hub are equipped with these compression cylinders and plungers, the hub will occupy a position central of the rim, as in Fig. 1, and the hub and its connections will be supported, first, by the air cushions $u$ in all the cylinders below a horizontal plane through the center of the wheel, and, second, by the suction in the cylinders above said plane, which will be apparent by a reference to Figs. 1 and 2. The plungers are made to fit the cylinders sufficiently freely to avoid the surfaces cutting and sticking together, and a little oil will make them practically air tight. If an actual air tight fit of the plungers is required, it is easily obtainable by providing the plungers with piston packing rings, as at $w$ $w$, Fig. 3. It is conceivable that such a wheel on a heavy machine, by long standing of the machine, might have the air forced out from under the pistons on the lower side of the wheel, thus allowing the hub to settle within the rim, as shown in Fig. 6. But as soon as the wheel begins to revolve, it turns upon full cylinders, and where there were chances for the air to escape from a cylinder it could again enter the cylinder, so that motion to the wheel would at once establish an equilibrium in the cylinders. When the wheel is in motion the quick change of pressure from one cylinder to another allows so little chance for the escape of air, that the wheel is operative even with comparatively loose fitting cylinder plungers.

One object in making the hinges upon the cylinders and plungers fit in semi-circular sockets, is, to give them freedom of action. Thus, in Fig. 6, the hub of the wheel is shown to stand somewhat eccentric to the rim, and that the upper and lower cylinders are out of alinement, yet the changed positions do not affect the proper and free action of the plungers and cylinders. Additional compression cylinders $i$ are used as shown in Fig. 1, between the main cylinders $e$, to give a still greater elasticity to the wheel, and incidentally to prevent an excessive displacement of the relative positions of the hub and rim, similar to that shown in Fig. 6.

Lugs are provided on opposite sides of the cylinders $e$, and a cylinder $i$ is hinged to the lugs on one cylinder, and a plunger $l$ in said cylinder is hinged to the lugs on the opposite cylinder $e$, each of the cylinders $e$ having hinged to one of its sides a cylinder $i$, and to the other side a plunger $l$, as particularly shown in Fig. 3. One of these intermediate cylinders is shown in longitudinal section in Fig. 1. It will be seen that they have a cushioning action upon the side movements of the cylinders $e$, and that they also share in the cushioning effect of pressure upon the hub but this wheel is designed to dispense with the tire $d$.

In Fig. 5 is shown an air inlet to the chamber $u$, through a hole 9 in the wall of the cylinder, and a hole 8 through the plunger. In case separation of the members in the chamber should reach a point producing too much of a vacuum, on the withdrawal of the plunger, the coincidences of the holes 8 and 9 would fill the chamber with air. The holes are located at a point where they would not come together except in an extreme depression of the plunger.

This wheel is shown with eight axial cylinders or air compressors, but the number employed would be regulated by the service to which the wheel would be subjected, and to the space that would be available. For some uses the intermediate compressors would not be required.

A means of incasing the operating parts of the wheel to protect them from dust, is shown in Figs. 1 and 2. A portion of a plate $c$ is shown in Fig. 1, as secured to the rim of the wheel by the screws $r$. The plate is open at the center somewhat removed from the axle hub. The hub $a$ is shown to have a projecting surface $m$ with which the plate lies in contact. Fig. 2 shows that the plate is fast to the rim of the wheel in a manner to hold it apart from the air compressors, and that the central part of the plate lies against the rim $m$.

The tire upon this wheel may be of the solid or composite type known as a commercial tire, as at $g$, Fig. 1, or $b'$ $b''$, Fig. 2, or it may be a pneumatic tire as at $d$, Fig. 1. Combined with the pneumatic tire, the devices described will prolong the life of the pneumatic tire by reason of the device relieveing the pneumatic tire of the effects of sudden blows that tend to rupture an inflated tire. The relief comes from the additional elasticity of the wheel offered by this invention.

Oviously, it does not matter whether it is the compression cylinder or the plunger in this combination that is placed next to the rim of the wheel. In the application of this invention the right is claimed to vary the construction of the several parts, so long as the principles of the invention are adhered to.

Claim.

In a pneumatic wheel for vehicles, a wheel rim, hinge lugs on the inner surface of the rim, a diametrically enlarged hub forming with the outer rim a wheel rim within a wheel rim, hinge lugs on the periphery of said hub corresponding with the hinge lugs on the outer rim, radial air compressor cylinders hinged to the outer hinge lugs, plungers closely fitting the cylinders hinged to the lugs on the hub, lugs on the sides of the radial cylinders parallel with the wheel rims, compression cylinders and plungers hinged between each pair of radial cylinders to the lugs on the radial cylinders, and an air inlet to the chamber of the compression cylinders, comprising a hole in the wall of the compression cylinder and a hole in the plunger adapted to coincide in certain positions of the plunger in the cylinder.

Signed at Peekskill in the county of Westchester and State of New York this 22nd day of November, A. D. 1911.

THOMAS PENDELL.

Witnesses:
ALBERT E. CRUGER,
RUTHERFORD YOCOM.